United States Patent
Morovic et al.

(10) Patent No.: US 10,377,081 B2
(45) Date of Patent: Aug. 13, 2019

(54) PROCESSING THREE-DIMENSIONAL OBJECT DATA FOR STORAGE

(71) Applicant: Hewlett-Packard Development Company, L.P., Houston, TX (US)

(72) Inventors: Peter Morovic, Sant Cugat del Valles (ES); Jan Morovic, Colchester (GB); Jun Zeng, Sunnyvale, CA (US); Scott White, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 63 days.

(21) Appl. No.: 15/544,803

(22) PCT Filed: Apr. 24, 2015

(86) PCT No.: PCT/US2015/027529
§ 371 (c)(1),
(2) Date: Jul. 19, 2017

(87) PCT Pub. No.: WO2016/171719
PCT Pub. Date: Oct. 27, 2016

(65) Prior Publication Data
US 2018/0029297 A1    Feb. 1, 2018

(51) Int. Cl.
*B29C 64/386* (2017.01)
*B33Y 50/00* (2015.01)
*G05B 19/4099* (2006.01)
*H04N 1/41* (2006.01)

(52) U.S. Cl.
CPC ............ *B29C 64/386* (2017.08); *B33Y 50/00* (2014.12); *G05B 19/4099* (2013.01); *H04N 1/41* (2013.01); *G05B 2219/49023* (2013.01)

(58) Field of Classification Search
CPC ... B29C 64/386; B33Y 50/00; G05B 19/4099; G05B 2219/49023; H04N 1/41
See application file for complete search history.

(56) References Cited

U.S. PATENT DOCUMENTS 5,273,632 A * 12/1993 Stockham ........ G01N 27/44717
204/450
5,321,622 A * 6/1994 Snead .................... B29C 64/40
345/419

(Continued)

FOREIGN PATENT DOCUMENTS

EP          1217438       6/2002
WO     WO-2014074954     5/2014

OTHER PUBLICATIONS

International Search Report and Written Opinion dated Dec. 22, 2015, PCT Patent Application No. PCT/US2015/027529, filed Apr. 24, 2015, Korean Intellectual Property Office.

(Continued)

*Primary Examiner* — Thomas C Lee
*Assistant Examiner* — Michael Tang
(74) *Attorney, Agent, or Firm* — HP Inc. Patent Department

(57) ABSTRACT

A method is described in which data representing a three-dimensional object to be printed is obtained. The data comprises object property data indicative of properties of the three-dimensional object. Layers within the three-dimensional object to be printed are identified. The obtained data is processed by comparing object property data associated with an identified layer to object property data associated with a reference layer selected from the identified layers. Where a difference in object property data associated with an identified layer and object property data associated with a reference layer is determined, the determined difference is stored.

18 Claims, 3 Drawing Sheets

(56) References Cited

U.S. PATENT DOCUMENTS

| | | | |
|---|---|---|---|
| 5,627,771 A | | 5/1997 | Makino |
| 5,936,615 A | * | 8/1999 | Waters .................. G06F 3/0428 |
| | | | 345/156 |
| 6,104,403 A | | 8/2000 | Mukouchi et al. |
| 7,589,868 B2 | | 9/2009 | Velde et al. |
| 7,636,610 B2 | | 12/2009 | Schillen et al. |
| 8,761,918 B2 | | 6/2014 | Silverbrook |
| 9,840,072 B2 | * | 12/2017 | Kao ....................... B33Y 50/00 |
| 2002/0186383 A1 | | 12/2002 | Obrador |
| 2006/0159181 A1 | * | 7/2006 | Park ..................... H04N 19/176 |
| | | | 375/240.24 |
| 2010/0290528 A1 | * | 11/2010 | Chengalvala ........ H04N 19/159 |
| | | | 375/240.16 |
| 2011/0285054 A1 | | 11/2011 | Eliahu |
| 2013/0083964 A1 | | 4/2013 | Morris et al. |
| 2013/0208992 A1 | * | 8/2013 | Lin ......................... G06T 9/004 |
| | | | 382/236 |
| 2014/0175706 A1 | | 6/2014 | Kritchman |
| 2014/0345521 A1 | | 11/2014 | Silverbrook |
| 2015/0304663 A1 | * | 10/2015 | Solaja ..................... G07F 17/32 |
| | | | 375/240.24 |
| 2016/0150231 A1 | * | 5/2016 | Schulze ............... H04N 19/132 |
| | | | 375/240.12 |

OTHER PUBLICATIONS

Kiril Vidimce, et al., "OpenFab: A Programmable Pipeline for Multi-Material Fabrication", Apr. 27, 2013 http://cfg.mit.edu/content/openfab-programmable-pipeline-multi-material-fabrication.

* cited by examiner

PROCESSING THREE-DIMENSIONAL OBJECT DATA FOR STORAGE

CLAIM FOR PRIORITY

The present application is a national stage filing under 35 U.S.C. § 371 of PCT application number PCT/US2015/027529, having an international filing date of Apr. 24, 2015, the disclosure of which is hereby incorporated by reference in its entirety.

BACKGROUND

Three-dimensional objects generated by an additive manufacturing process may be formed in a layer-by-layer manner. In one example of additive manufacturing, an object is generated by solidifying portions of layers of build material in an apparatus. In examples, the build material may be in the form of a powder, fluid or sheet material. The intended solidification and/or physical properties may be achieved by printing an agent onto a layer of the build material. Energy may be applied to the layer and the build material on which an agent has been applied may coalesce and solidify upon cooling. In other examples, chemical binding agents may be used, which may not need the application of energy to solidify. For example, three-dimensional objects may be generated by using extruded plastics or sprayed materials as build materials, which solidify to form an object.

Some printing processes that generate three-dimensional objects use control data generated from a model of a three-dimensional object. This control data may, for example, specify the locations at which to apply an agent to the build material, or where a build material itself may be placed, and the amounts to be placed.

The control data may be generated from a three-dimensional representation of an object to be printed.

BRIEF DESCRIPTION OF DRAWINGS

For a more complete understanding, various examples will now be described below with reference to the accompanying drawings in which.

DETAILED DESCRIPTION

Figure 1:
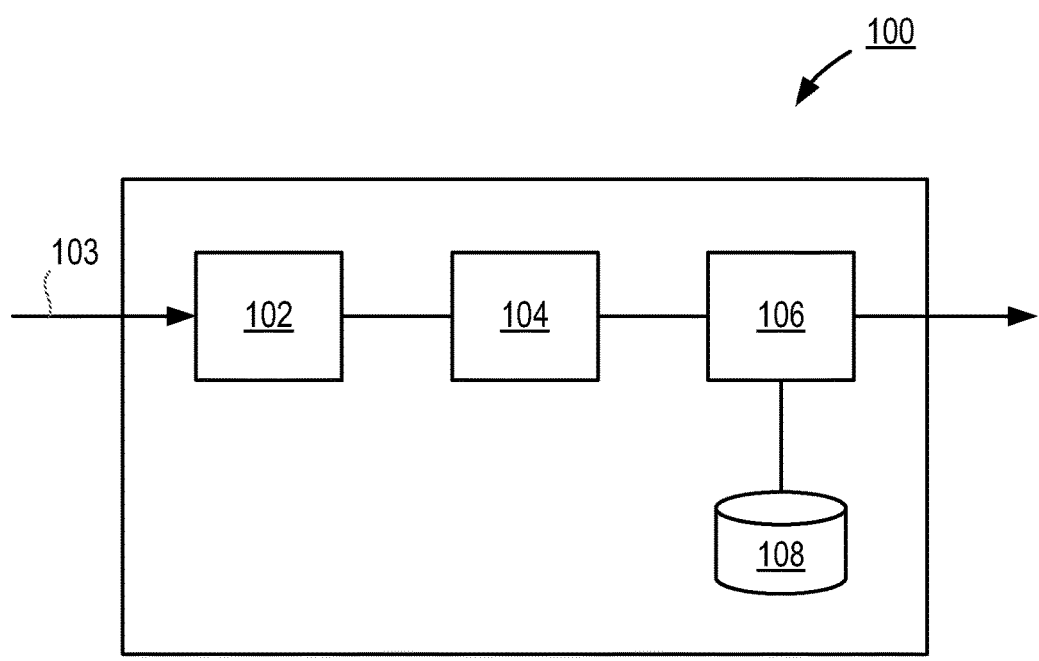
FIG. 1 is a block diagram of an example apparatus which makes use of the present disclosure.

Some examples described herein provide an apparatus and a method for processing a three-dimensional object to store data that may be used to produce the three-dimensional object. Some examples allow arbitrary three-dimensional content with a variety of specified object properties to be processed, stored and used to generate a three-dimensional object. These object properties may comprise appearance properties and/or mechanical properties such as colour, transparency, glossiness, strength, conductivity, density, porosity, etc.

In some examples herein, three-dimensional space is characterised in terms of sub-volumes. The sub-volumes may be in the form of "voxels", i.e. three-dimensional pixels, wherein each voxel occupies a discrete volume. However, it will be understood that the sub-volume may be any volumetric entity that may take any shape (for example, cubic, cuboid, tetrahedron, or any other shape). In data modelling a three-dimensional object, a sub-volume at a given location may have at least one property. For example, it may be empty, it may have a particular colour, it may represent a particular material, it may represent a particular structural property, and/or the like.

In some examples, data representing a three-dimensional object is processed to set properties to be used in generating the object.

In some examples, a material volume coverage representation defines print material data, for example detailing the amount of print materials (such as agent(s) to be deposited onto a layer of build material, or in some examples, build materials themselves), and, if applicable, their combinations. In some examples, this may be specified as a proportional volume coverage (for example, X % of a region of a layer of build material should have agent Y applied thereto). Such print materials may be related to or selected to provided an object property such as, for example, colour, transparency, flexibility, elasticity, rigidity, surface roughness, porosity, conductivity, inter-layer strength, density, and the like.

The actual location at which each print material (for example, a drop of an agent) should be applied may be determined using halftoning techniques.

For example, a set of sub-volumes within object model data may have an associated set of material volume coverage (Mvoc) vectors. In a simple case, such a vector may indicate that X % of a given region of three-dimensional space should have a particular agent applied thereto, whereas (100−X)% should have no agent applied thereto. The material volume coverage representation may then provide the input for a halftoning process to generate control data that may be used by an additive manufacturing system to produce a three-dimensional object. For example, it may be determined that, to produce specified object properties, 25% of a layer of build material (or of a portion of a layer) should have an agent applied thereto. The halftoning process determines where the drops of agent should be deposited in order to provide 25% coverage, for example, by comparing each location to a threshold value provided in a halftone threshold matrix. In another case, there may be two agents and the volume coverages of each of them, of their combination and of the volume left clear may be directly determined.

It may be the case that, at the time the 3D data model is constructed, a print apparatus to be used to print the object is unspecified, at least in terms of its capabilities.

The present subject-matter is further described with reference to FIGS. 1, 2 and 3. It should be noted that the description and figures merely illustrate principles of the present subject-matter. It is thus understood that various arrangements may be devised that, although not explicitly described or shown herein, embody the principles of the present subject-matter. Moreover, all statements herein reciting principles and examples of the present-subject matter, as well as specific examples thereof, are intended to encompass equivalents thereof.

FIG. 1 is an apparatus 100 according to an example of the present subject-matter. The apparatus 100 comprises an obtaining module 102 to obtain data 103 representing a three-dimensional object, an identifying module 104 to identify layers (or slices) within the three-dimensional object, a processor 106 to process the obtained data and a machine-readable storage 108 to store data. The machine-readable storage 108 may store data for access by an application program being executed by the processor 106 and may comprise a data structure including information for use by the application program. The machine-readable storage 108 may be any electronic, magnetic, optical or other physical storage device that stores executable instructions. Thus, machine-readable storage 108 may be, for example, a Random Access Memory (RAM), an Electrically-Erasable Programmable Read-Only Memory (EEPROM), a storage drive, an optical disc or the like. The machine-readable storage 108 may be encoded with executable instructions.

Figure 2:
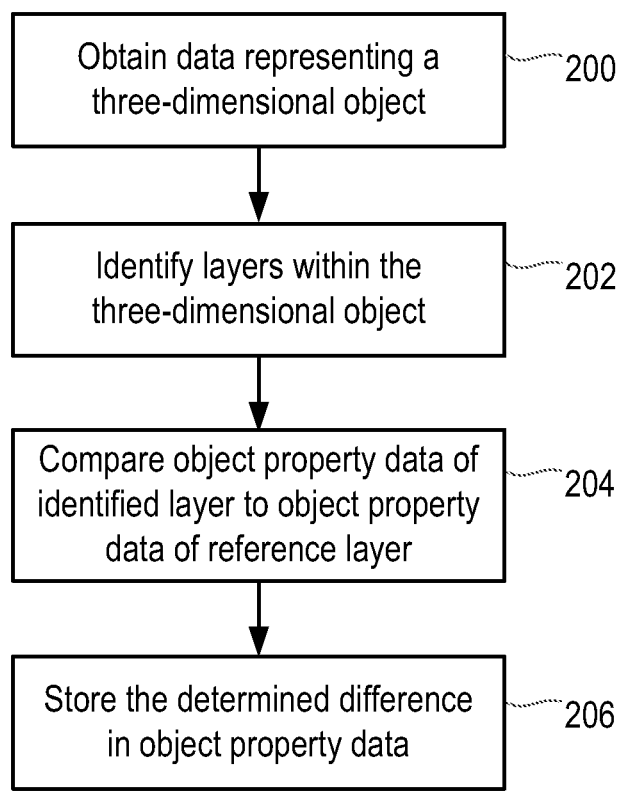
FIG. 2 is a flowchart of an example of a process which may be employed according to the present disclosure.

FIG. 2 is a flowchart of an example of a process which may be employed according to the present disclosure and will now be described also with reference to FIG. 1.

At block 200, the obtaining module 102 obtains data representing a three-dimensional object to be printed. The data comprises object property data indicative or representing of properties of the three-dimensional object. For example, the object property data may comprise material property data, structural property data, printing property data and/or any other object property data. The material property data may, for example, include information on the use of materials (such as build materials and/or agents to be deposited onto build materials). For example, the material property data may include data indicating material type, material quantity, material weight, material density, material distribution, material combination (for example, the combination of build materials and agents, the combination of build materials themselves, etc), material volume coverage (Mvoc) information or vectors (as described earlier), colour information and/or any other material property data. The structural property data may, for example, include information on the distribution of materials. For example, the structural property data may include data indicating structural size, structural shape, halftoning information (such as a choice of algorithm, resources, etc) and/or any other structural property data. The printing property data may, for example, include information on the settings to use for the printing system. For example, the printing property data may include data indicating a printing process, a printing technique, printing speed, fusing temperature, an instruction to set different material property data and/or structural property data (for example, depending on the availability of materials and/or structures supported) and/or any other printing property data.

At block 202, the identifying module 104 identifies layers (or slices) within the three-dimensional object. In one example, the identified layers may comprise a plurality of predefined sub-volumes (such as voxels or any shape of volume, for example, cubic, cuboid, tetrahedron, etc). The identifying module 104 may identify layers that are defined explicitly or pre-programmed for the object to be printed (for example, in the form of rasters or discrete locations per layer) or may identify layers by defining layers itself.

The identifying module 104 may use received object geometry and object property data as an input and process a series of N layers. The number of layers N may be determined, for example, depending on the printing mechanism to be used and the final size of an object. For example if the printing mechanism builds layers along the z-axis (i.e. is "z-additive") and assuming each layer has the same thickness, the number of layers N may be given by the height H of the object divided by the thickness L of a single layer, i.e. N=H/L.

Once the identifying module 104 has determined the number of layers N, the identifying module 104 may process the object geometry by intersecting the geometry (for example, using a spatial tessellation) with a plane parallel to the z-axis at a proportional height depending on the layer to be processed. The identifying module 104 may thus obtain a geometric representation of a layer. The geometric representation of a layer may, for example, be in the form of a two-dimensional tessellation or a bounding polygon (for example, if the object is filled in on the interior).

The identifying module 104 may map the obtained geometric representation of the layer to the object property data. This may be achieved by the identifying module 104 interpreting the [X, Y, Z] location of the current layer (meaning that Z is constant) in terms of the object property data and may assign appropriate object properties to individual vertices of the geometric representation of the layer.

The identifying module 104 may perform rasterisation (i.e. conversion into a series of discrete locations). For example, the identifying module 104 may convert the geometric representation (such as in the form of a polygon or tessellation) together with the assigned object property data into printing sub-volumes (such as pixels or voxels). The converted geometric representation with object properties at each sub-volume may be a raster bitmap and the sub-volumes may comprise as many channels as there are object properties. For example, in the case of colour, the converted geometric representation may be a raster colour (RGB) bitmap and sub-volumes may comprise an alpha-channel.

At block 204, the processor 106 processes the data obtained by the obtaining module 102. The processor 106 processes the data by comparing object property data associated with or in respect of an identified layer to object property data associated with or in respect of a reference layer that is selected or chosen from the identified layers. The reference layer (or "key frame") may be identified as a layer within the three-dimensional object against which other layers within the three-dimensional object are compared during processing by the processor 106. The processor 106 may compare layers within the three-dimensional object to any number of reference layers (for example, one reference layer, two reference layers or any other number of reference layers). In one example, the reference layer may comprise a plurality of sub-volumes (such as voxels or any shape of volume, for example, cubic, cuboid, tetrahedron, etc) corresponding to a plurality of predefined sub-volumes in the identified layers. There are various ways in which a reference layer may be selected, and a few examples of ways in which the reference layer may be selected will now be described.

In one example, a static selection may be used to select a reference layer from the identified layers. For example, every $x^{th}$ layer out of the identified layers may be selected as a reference layer.

In another example, the reference layer may be selected from the identified layers based on the distance between those identified layers and the layer being processed. For example, the distance from the layer being processed to the identified layers may be determined and the reference layer may be selected as the identified layer that is determined to be the shortest distance away from the layer being processed (i.e. the layer that is determined to be spatially closest in the sequence of identified layers to the layer being processed). In this example, the reference layer may be selected as an adjacent layer to the layer being processed. For example, the reference layer may be selected as a subsequent layer to the layer being processed (such as the layer located above the layer being processed) or a preceding layer to the layer being processed (such as the layer located below the layer being processed).

In this example, the reference layer may be the layer that was processed before the layer currently being processed. For example, the reference layers may be selected sequentially during the processing of the identified layers. Once an identified layer has been processed, the identified layer may be selected as the reference layer for the next identified layer to be processed and so on. In this example, for each layer i, the reference layer can be considered to be layer i−1 since the previous layer would have been processed and, in the process, populated with full data. In this example, it is the difference between subsequent layers that is determined. In this way, a previous layer to the layer being processed is the reference layer.

In another example, the reference layer may be selected from the identified layers a priori such as by using a sequential sampling process. For example, the reference layer may be selected from the identified layers based on a comparison of a metric for the identified layers. The metric may be, for example, an entropy, etc. The metric may be plotted against the identified layers and, depending on the result, one or more of those identified layers may be selected as a reference layer. For example, the reference layer may be selected from the identified layers as the layer determined to have the largest rate of change (i.e. the largest gradient) in the metric.

The metric may be, for example, the relative number of sub-volumes that differ compared to the reference layer (for example, the proportion of sub-volumes in a layer that have changed). The metric may be, for example, a magnitude such as a difference in object property data between sub-volumes in the layer being processed and the reference layer. For example, sub volumes may have changed but not sufficiently to warrant different processing. This may take into account Mvoc mapping, the precision of the halftoning process, etc. The metric may be, for example, a visual metric. For example, where the object property data includes colour data, the colour data may be mapped to a colorimetric space and the colour difference may be determined. In an example, if the maximum colour difference is below a predetermined threshold, the difference may not be processed or stored. The metric may be, for example, a geometric metric. For example, it may be determined whether the locations of sub-volumes in a layer have changed (for example, a Euclidean distance may be determined) by more than a predetermined threshold. Although some examples of metrics are provided, it will be understood that any other metric may be used and any combination of metrics may be used.

As mentioned above, at block 204, the processor 106 processes the data obtained by the obtaining module 102 by comparing object property data associated with an identified layer to object property data associated with a reference layer selected from the identified layers. Thus, once a reference layer has been selected (perhaps using one of the methods discussed above), then for a given layer i, the processor 106 may compare that layer to the reference layer. For example, the processor 106 may compare a bitmap associated with the layer i to a bitmap associated with the reference layer. The processor 106 may determine a difference in object property data associated with the identified layer and object property data associated with the reference layer.

In one example, the processor 106 may compare object property data associated with a predefined sub-volume (such as voxels or any shape of volume, for example, cubic, cuboid, tetrahedron, etc) in the identified layer to object property data associated with a corresponding sub-volume in the reference layer. The processor 106 may determine a difference in object property data associated with the predefined sub-volume in the identified layer and object property data associated with the corresponding sub-volume in the reference layer.

In one example, the processor 106 may perform the comparison between the layer being processed and the reference layer by way of a difference image. FIG. 3 is an example illustration of a comparison that can be made by the processor 106 using a difference image. Here, FIG. 3(a) is an example image representation of an identified layer i that is being processed, FIG. 3(b) is an example image representation of a reference layer i−1 and FIG. 3(c) is an example representation of the image difference between the image representation of the reference layer i−1 and the image representation of the defined layer i. As shown in FIG. 3(c), the image difference in this example amounts to four lines of single pixel width that have been added in the defined layer i that is being processed (compared to the reference layer i−1).

Where the processor 106 determines a difference in object property data associated with the identified layer and object property data associated with the reference layer, the processor 106 may compare the determined difference to a predetermined threshold. If the determined difference exceeds the predetermined threshold, the processor 106 may select a different reference layer from the identified layers or may instruct the identifying module 104 to identify a new layer to be used as the reference layer. In an example, the processor 106 may select the layer being processed (i.e. the current layer) to be the new reference layer.

In one example, the processor 106 may determine that the identified layer has the same object property data as the reference layer. For example, the processor 106 may determine that the difference in object property data associated with the identified layer and object property data associated with the reference layer is zero or below a predetermined threshold. In this example, the processor 106 may assign an indicator to the identified layer that will indicate (for example, in future processing and/or printing) that the object property data associated with the reference layer is to be used.

The reference layer that has the same object property data as the identified layer being processed may have the same orientation as the identified layer being processed or may have a different orientation. For example, the processor 106 may determine a change in an orientation of the identified layer with respect to the reference layer that, when taken into account, would provide the same object property data. In this example, the processor 106 may assign an indicator to the identified layer that will indicate (for example, in future processing and/or printing) the reference layer from which object property data can be retrieved and the change in the orientation of that reference layer with respect to the identified layer.

The change in orientation may comprise, for example, rotations, translations, shifts, scaling and/or skews. For example, the processor 106 may look for two-dimensional shifts of layers to align with previous layers. In this example, the processor 106 may define two scalars in the form of an [x,y] shift that may be subsequently stored by the machine-readable storage 108. The processor 106 may also perform an affine, error minimising transform (for example, a 2×2 matrix may be applied in two dimensions or a 3×3 matrix may be applied in three dimensions) for the current layer with respect to the reference layer and evaluate the error between the reference layer and the transformed current layer. In this way, the processor 106 may be able to determine other changes in orientation such as those mentioned earlier.

In one example, the processor 106 may derive an error minimising affine transform based on the geometry of the reference layer. For example, the processor 106 may define a sequence of [x,y] coordinates in the vector domain (or may define locations in an alpha-channel). The processor 106 may apply the transform by multiplication of the [x, y] coordinates and may evaluate the error by comparing (for example, a Euclidean distance of) the [x, y] coordinates after transformation with a set of target coordinates [x, y].

In another example, the processor 106 may determine that object property data associated with a sub-volume in the identified layer being processed is the same as object property data associated with a corresponding sub-volume in the reference layer. For example, the processor 106 may determine that the difference between the object property data associated with the sub-volume in the identified layer being processed and the object property data associated with a corresponding sub-volume in the reference layer is zero or below a predetermined threshold. In this example, the processor 106 may assign an indicator to the identified layer that will indicate (for example, in future processing and/or printing) that the object property data associated with the sub-volume of the reference layer is to be used for that sub-volume. Alternatively or in addition, in this example, the processor 106 may assign an indicator to that sub-volume in the identified layer being processed to indicate that object property data for that sub-volume need not be stored or subsequently processed. The indicator may be, for example, in the form of a predetermined value, a tag or a pointer. For example, the pointer may be a pointer to a particular palette representation that has a reserved palette entry to indicate 'no data'.

In another example, the processor 106 may identify an area in the identified layer having the same object property data as an area in the reference layer. For example, the processor 106 may determine that the difference between the object property data associated with the identified area in the identified layer and the object property data associated with the area in the reference layer is zero or below a predetermined threshold. In this example, the processor 106 may not process the object property data for this area of the identified layer. Instead, the processor 106 may assign an indicator that indicates the area in the reference layer having the same object property data. This area can be copied from the reference layer in future processing and does not need to be stored for the layer. In an example that uses constant halftoning (for example, where the same pattern appears in more than one layer), the same print-ready halftone data may be copied for the common areas of the layer (for example, those areas of the layer that are the same as another layer) while the processor 106 may process those that are new or different. The processor 106 may determine that more than one area of a layer has the same object property data as an area of the reference layer and may process those areas in the manner described here.

The area of the reference layer that has the same object property data may be at the same position in the reference layer as it is in the layer being processed or at a different position. The area of the reference layer that has the same object property data may have the same orientation in the reference layer as it is in the layer being processed or a different orientation. For example, the processor 106 may determine that the difference in object property data associated with an identified layer and object property data associated with a reference layer comprises a change in an orientation of the identified layer with respect to the reference layer. The change in orientation may comprise, for example, rotations, translations, shifts, scaling and/or skews. In this example, the processor 106 may assign an indicator to the identified layer that will indicate (for example, in future processing and/or printing) the area in the reference layer from which object property data can be retrieved and the change in the orientation of that area with respect to the area in the identified layer.

The processor 106 may apply pattern recognition approaches to identify areas (such as a collection of pixels) in the layers that have a similar arrangement of object property data. For example, the same arrangement of object property data that is rotated, translated, and/or scaled, etc. In this way, the machine-readable storage 108 will not need to store all of the object property data for the layer (for example, pixel-by-pixel values). Instead, as will be discussed in more detail later, the machine-readable storage 108 may store an indicator with a reference to the particular area in the reference layer with rotation, translation and/or scaling information. This method may be lossy with the loss of precision being a parameter that can be controlled.

In another example, the processor 106 may compare object property data associated with an identified layer to object property data associated with a reference layer by determining a weighted difference in object property data associated with the identified layer and object property data associated with two or more reference layers selected from the identified layers. For example, the processor 106 may determine a weighted difference in object property data associated with an identified layer that is being processed and object property data associated with two neighbouring reference layers (for example, a layer above the layer being processed and a layer below the layer being processed). The processor 106 may determine the weights by minimising the amount of object property data that needs to be stored by the machine-readable storage 108. In a way, the layer that is being processed may be interpolated based on the two layers that bound it. In determining the weighted difference in object property data, the processor 106 may assign more or less weight to certain differences. For example, the processor 106 may assign more weight to differences in certain object property data than it does to differences in other object property data.

The processor 106 may compress data further by altering the resolution used for the layers based on the resolution of the printer to be used to produce or print the three-dimensional object. For example, if the printer resolution is lower than a bitmap resolution for the layer, the processor 106 may sample down a bitmap of the layer such that a smaller file will be created for storage in the machine-readable storage 108. Further compression techniques may also be employed by the processor 106. For example, the processor 106 may use an MPEG standard and inter-frame compression technique in the context of a three-dimensional file format, effectively treating the three-dimensional file as a movie (i.e. a sequence of frames).

At block 206, where a difference in object property data associated with the identified layer and object property data associated with the reference layer is determined, the machine-readable storage 108 stores the determined difference.

In one example, the machine-readable storage 108 may encode the determined difference in object property data and may store the encoded determined difference.

The machine-readable storage 108 may store the determined difference in object property data in a three-dimensional file format such as a bitmap. The three-dimensional file format may store geometry and per layer bitmap information. The per layer bitmap information will include the determined difference in object property data, which may, for example, relate to colour (perhaps in the form of RGBs), conductivity, and other object property data previously mentioned.

In some formats where layer information is encoded as a bitmap, the spatial redundancy may be substantial and subsequent layers may change in a small proportion of the total number of pixels in the bitmap. The machine-readable storage 108 may not encode parts of the layer that have not changed compared to the previous layer. In one example, the object property data may be mapped (for example, using a bitmap format) to the material and/or agent used (for example, using material volume coverage Mvoc vectors) for those sub-volumes where it has changed with respect to a previous layer.

Where the processor 106 has assigned an indicator in respect of an identified layer (as described above), the machine-readable storage 108 may store that indicator. As previously mentioned, the indicator may be, for example, in the form of a predetermined value, a tag or a pointer.

For example, the machine-readable storage 108 may store an indicator to indicate that the object property data associated with a reference layer is to be used for an identified layer. The machine-readable storage 108 may store an indicator to indicate a reference layer from which object property data can be retrieved for an identified layer and a change in the orientation of that reference layer with respect to the identified layer. The machine-readable storage 108 may store an indicator to indicate that the object property data associated with a sub-volume of a reference layer is to be used for a sub-volume of an identified layer. The machine-readable storage 108 may store an indicator to indicate that object property data for a sub-volume of an identified layer is not stored. The machine-readable storage 108 may store an indicator to indicate an area in the reference layer having the same object property data as the identified layer. The machine-readable storage 108 may store an indicator to indicate an area in a reference layer from which object property data can be retrieved for an identified layer and a change in the orientation of that area with respect to the area in the identified layer.

In some examples, the machine-readable storage 108 may store an indicator instead of object property data itself. For example, the machine-readable storage 108 may store a pointer to an appropriate object property data (such as RGB values or any other values) in a particular palette representation that has a reserved palette entry to indicate 'no data'. Elsewhere, where the processor 106 determines that the object property data is different to the object property data in the reference layer, the machine-readable storage 108 may store the actual object property data (for example, the actual bitmap values) for the layer.

The machine-readable storage 108 may store any combination of object property data and indicators described above for the identified layers.

Figure 3:
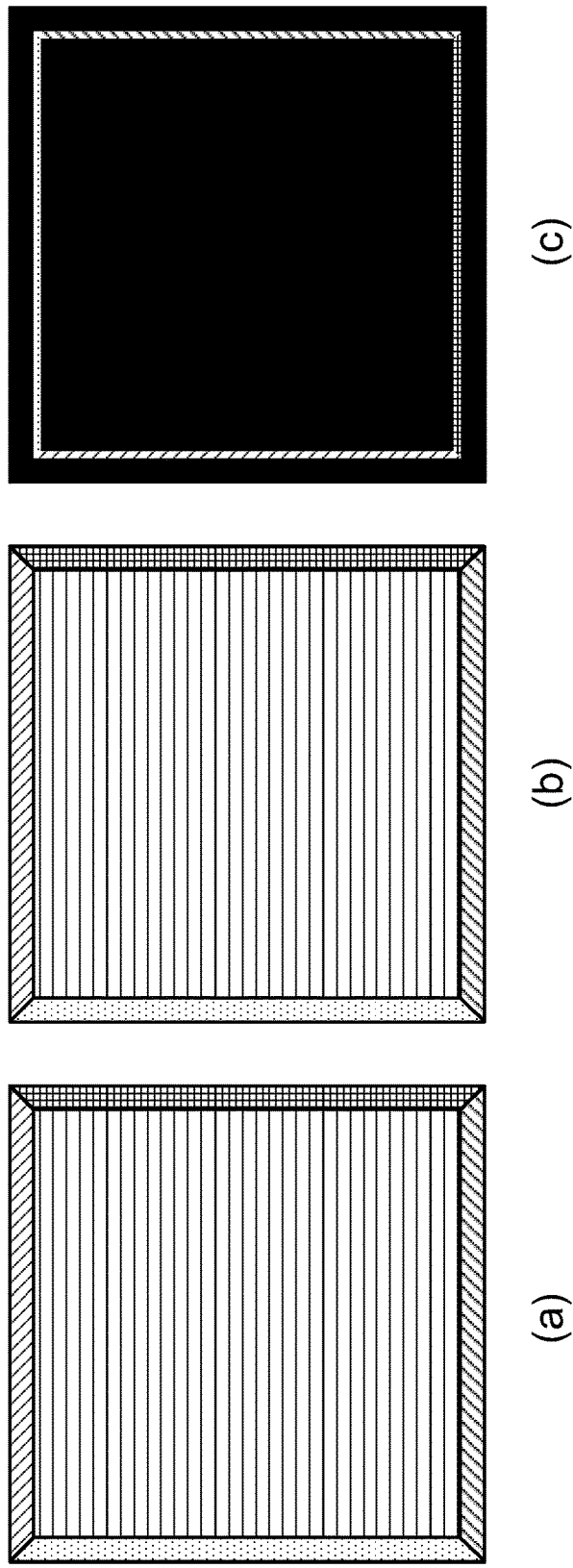
FIG. 3 is an example illustration of an image difference technique which may be used according to the present disclosure.

In the example shown in FIG. 3, the machine-readable storage 108 may store the values (for example, RGBA values) of the pixels in the four lines of pixels for future processing of the layer i, while for the other pixels (illustrated as solid black in FIG. 3(c)), the machine-readable storage 108 may store an indicator (such as a predetermined value) that will indicate in future processing that values from the reference layer i−1 can be used for these pixels.

Where the processor 106 determines that a difference in object property data associated with the identified layer and object property data associated with the reference layer exceeds a predetermined threshold, the machine-readable storage 108 may store the obtained object property data for that identified layer fully.

In the manner described above, the machine-readable storage 108 may encode and store new object property data (i.e. object property data that has not previously been processed in respect of another layer). The machine-readable storage 108 may also store reference layers and the object property data that is associated with those reference layers. The stored object property data may be used to print the object, as will be discussed below.

As mentioned, the data stored in the machine-readable storage 108 may be used to produce or print a three-dimensional object. The processor 106 may instruct the apparatus 100 to produce or print the three-dimensional object based on the data stored in the machine-readable storage 108. The processor 106 may instruct the apparatus 100 to produce or print automatically or may receive a user input instructing production or printing to begin. The processor 106 may receive the user input instructing production or printing to begin at any stage in the process according to the present disclosure. For example, the processor 106 may receive the user input instructing production or printing to begin once the machine-readable storage 108 has stored the object property data for an object to be printed or at any other stage during the process according to the present disclosure. The processor 106 may provide the data stored in the machine-readable storage 108 to another apparatus, device or system (not shown) for object production or printing.

The process of the present disclosure may be lossless (for example, each determined difference in object property data may be stored) or may be extended for use in lossy methods (for example, there may be a predetermined threshold employed below which determined differences in object property data are ignored).

The above described method may apply at various levels in a printing process. For example, the method may be programmed internally in a printer. In another example, a non-transitory machine-readable storage medium may be encoded with instructions executable by a processor to perform the method. The method may be used in conjunction with any other programs for processing a three-dimensional object (for example, programs that process three-dimensional models with texture maps).

Examples in the present disclosure can be provided as methods, systems or machine-readable instructions, such as any combination of software, hardware, firmware or the like. Such machine-readable instructions may be included on a machine-readable storage medium (including but is not limited to disc storage, CD-ROM, optical storage, etc.) having machine-readable program code therein or thereon.

The present disclosure is described with reference to flow charts and/or block diagrams of the method, apparatus and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realised by machine-readable instructions.

The machine-readable instructions may, for example, be executed by a general purpose computer, a special purpose computer, an embedded processor or processors of other programmable data processing devices to realise the functions described in the description and figures. For example, a processing apparatus or processor, such as the processor 106, may execute the machine-readable instructions. Thus, functional modules of the apparatus and devices may be implemented by a processor executing machine-readable instructions stored in a memory, or a processor operating in accordance with instructions embedded in logic circuitry. The term "processor" is to be interpreted broadly to include a processing unit, central processing unit (CPU), application-specific integrated circuit (ASIC), logic unit, programmable gate array, etc. The methods and functional modules may all be performed by a single processor or divided amongst several processors.

Such machine-readable instructions may also be stored in a machine-readable storage, such as machine-readable storage 108, that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices provide a means for realising functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit and scope of the present disclosure. It should be noted that the above-mentioned examples illustrate rather than limit what is described herein, and that those skilled in the art will be able to design many alternative implementations without departing from the scope of the appended claims. For example, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   obtaining, by a processor, data representing a three-dimensional object to be printed, the data comprising object property data indicative of properties of the three-dimensional object;
   identifying, by the processor, layers within the three-dimensional object to be printed;
   processing, by the processor, the obtained data by comparing object property data associated with an identified layer to object property data associated with a reference layer selected from the identified layers; and
   responsive to determining a difference between the object property data associated with an identified layer and the object property data associated with the reference layer, storing, by the processor, the determined difference in place of the object property data associated with the identified layer,
   wherein the determined difference is stored in a three-dimensional file format for printing that includes geometry information of the three-dimensional object and per layer information of the identified layers, the per layer information including the determined difference.

2. The method according to claim 1, wherein the identified layers comprise a plurality of predefined sub-volumes and the reference layer comprises a plurality of sub-volumes corresponding to the plurality of predefined sub-volumes; and
   wherein comparing object property data comprises comparing object property data associated with a predefined sub-volume in the identified layer to object property data associated with a corresponding sub-volume in the reference layer.

3. The method according to claim 1, further comprising comparing the determined difference in the object property data associated with the identified layer and the object property data associated with the reference layer to a predetermined threshold and, where the determined difference exceeds the predetermined threshold, storing the obtained object property data for the identified layer.

4. The method according to claim 1, comprising printing the three-dimensional object using the stored determined difference in object property data.

5. The method according to claim 1, wherein selecting the reference layer from the identified layers comprises determining distances from the identified layers to the layer being processed and selecting the identified layer with the shortest distance to the layer being processed as the reference layer.

6. The method according to claim 1, wherein selecting the reference layer from the identified layers is based on a comparison of a metric for the identified layers.

7. The method according to claim 6, wherein selecting the reference layer from the identified layers comprises selecting the identified layer having the largest rate of change in the metric as the reference layer.

8. The method according to claim 1, further comprising comparing the determined difference in the object property data associated with the identified layer and the object property data associated with the reference layer to a predetermined threshold and, where the determined difference exceeds the predetermined threshold, selecting a different reference layer from the identified layers or identifying a new layer to be used as the reference layer.

9. The method according to claim 1 further comprising, when the determined difference in the object property data associated with the identified layer and the object property data associated with the reference layer is below a predetermined threshold, storing an indication to use the object property data associated with the reference layer.

10. The method according to claim 1, wherein comparing the object property data associated with the identified layer to the object property data associated with the reference layer comprises determining a weighted difference in the object property data associated with the identified layer and object property data associated with two reference layers selected from the identified layers.

11. The method according to claim 1, wherein the determined difference in the object property data associated with the identified layer and the object property data associated with the reference layer comprises a change in an orientation of the identified layer with respect to the reference layer and storing the determined difference comprises storing the change in the orientation.

12. The method according to claim 1, wherein comparing the object property data associated with the identified layer to the object property data associated with the reference layer comprises identifying an area in the identified layer having the same object property data as an area in the reference layer, the method comprising storing an indication of the area in the reference layer having the same object property data as the area in the identified layer.

13. The method according to claim 1, wherein comparing the object property data associated with the identified layer to the object property data associated with the reference layer comprises identifying an area in the identified layer having the same object property data as an area in the reference layer at a different orientation, the method comprising storing an indication of the area in the reference layer having the same object property data and the orientation.

14. The method according to claim 1, wherein storing the determined difference further comprises:
 assigning an indicator for the identified layer, the indicator identifying the reference layer; and
 storing the indicator and the determined difference in place of the object property data associated with the identified layer, the determined difference including information on a change for the object property data associated with the reference layer with respect to the identified layer.

15. An apparatus comprising:
 a processor; and
 a machine-readable storage medium on which is stored machine-readable instructions that, when executed by the processor, cause the processor to:
  obtain data representing a three-dimensional object to be printed, the data comprising object property data indicative of properties of the three-dimensional object;
  identify layers within the three-dimensional object to be printed;
  process the obtained data by comparing object property data associated with an identified layer to object property data associated with a reference layer selected from the identified layers; and
  responsive to determining a difference between the object property data associated with the identified layer and the object property data associated with the reference layer, store the determined difference on the machine-readable storage medium in place of the object property data associated with the identified layer,
  wherein the determined difference is stored in a three-dimensional file format for printing that includes geometry information of the three-dimensional object and per layer information of the identified layers, the per layer information including the determined difference.

16. The apparatus according to claim 15, wherein the machine-readable instructions to store the determined difference are further to cause the processor to:
 assign an indicator to the identified layer, the indicator indicating the reference layer; and
 store the assigned indicator and the determined difference in place of the object property data associated with the identified layer, the determined difference including information on a change with respect to the object property data associated with the reference layer for the identified layer.

17. A non-transitory machine-readable storage medium encoded with instructions executable by a processor that, when executed by the processor, cause the processor to:
 obtain data representing a three-dimensional object to be printed, the data comprising object property data representing properties of the three-dimensional object;
 identify slices within the three-dimensional object to be printed;
 process the obtained data by comparing object property data in respect of an identified slice to object property data in respect of a key frame chosen from the identified slices; and
 responsive to determining a difference between the object property data associated with the identified slice and the object property data associated with the key frame, store the determined difference,
 wherein the determined difference is stored in a three-dimensional file format for printing that includes geometry information of the three-dimensional object and per layer information of the identified layers, the per layer information including the determined difference.

18. The non-transitory machine-readable storage medium according to claim 17, wherein the instructions to store the determined difference are further to cause the processor to:
 assign an indicator to the identified layer, the indicator indicating the reference layer; and
 store the assigned indicator and the determined difference in place of the object property data associated with the identified layer, the determined difference including information on a change with respect to the object property data associated with the reference layer for the identified layer.

* * * * *

UNITED STATES PATENT AND TRADEMARK OFFICE
CERTIFICATE OF CORRECTION

PATENT NO. : 10,377,081 B2
APPLICATION NO. : 15/544803
DATED : August 13, 2019
INVENTOR(S) : Peter Morovic et al.

It is certified that error appears in the above-identified patent and that said Letters Patent is hereby corrected as shown below:

In the Claims

In Column 12, Line 55, in Claim 9, delete "claim 1" and insert -- claim 1, --, therefor.

Signed and Sealed this
Twelfth Day of November, 2019

Andrei Iancu
*Director of the United States Patent and Trademark Office*